United States Patent
Yoshida et al.

(10) Patent No.: US 10,089,913 B2
(45) Date of Patent: Oct. 2, 2018

(54) PICTURE CONVERSION METHOD, PICTURE CONVERSION DEVICE, COMPUTER PROGRAM FOR PICTURE CONVERSION, AND PICTURE DISPLAY SYSTEM

(71) Applicant: EIZO Corporation, Ishikawa (JP)

(72) Inventors: Yuya Yoshida, Ishikawa (JP); Akinori Hayashi, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 15/328,947

(22) PCT Filed: Jul. 25, 2014

(86) PCT No.: PCT/JP2014/069757
§ 371 (c)(1),
(2) Date: Jan. 25, 2017

(87) PCT Pub. No.: WO2016/013125
PCT Pub. Date: Jan. 28, 2016

(65) Prior Publication Data
US 2017/0221405 A1 Aug. 3, 2017

(51) Int. Cl.
*G09G 3/20* (2006.01)
*H04N 5/57* (2006.01)
(Continued)

(52) U.S. Cl.
CPC ........... *G09G 3/2007* (2013.01); *G06T 5/009* (2013.01); *G09G 3/20* (2013.01); *G09G 3/3406* (2013.01);
(Continued)

(58) Field of Classification Search
CPC combination set(s) only.
See application file for complete search history.

(56) References Cited

U.S. PATENT DOCUMENTS

6,310,650 B1 * 10/2001 Johnson ................... H04N 9/12
348/189
2009/0027558 A1 * 1/2009 Mantiuk ............... H04N 1/6027
348/673
(Continued)

FOREIGN PATENT DOCUMENTS

JP 2005-070080 A 3/2005
JP 2011-112961 A 6/2011
(Continued)

OTHER PUBLICATIONS

International Search Report dated Oct. 14, 2014 in corresponding Application No. PCT/JP2014/069757; 2 pgs.

*Primary Examiner* — Ryan M Gray
(74) *Attorney, Agent, or Firm* — Maier & Maier, PLLC

(57) ABSTRACT

Provided is a picture conversion method capable of, when displaying a picture obtained from identical video data on a display device at different display luminances, converting the picture so that appearances of the picture visually come close to each other. The method includes a step of converting the picture by setting gradation characteristics when displaying the picture at a second luminance so that an inter-close gradation JND corresponding value difference at the second display luminance comes close to an inter-close gradation JND corresponding value difference at a first display luminance in a target gradation range which is at least part of an entire gradation range.

16 Claims, 13 Drawing Sheets

(51) Int. Cl.
    *H04N 21/41*    (2011.01)
    *H04N 21/431*   (2011.01)
    *G09G 3/34*     (2006.01)
    *G06T 5/00*     (2006.01)

(52) U.S. Cl.
    CPC .......... H04N 5/57 (2013.01); H04N 21/4122 (2013.01); H04N 21/4318 (2013.01); *G09G 2320/0276* (2013.01); *G09G 2320/062* (2013.01); *G09G 2320/0626* (2013.01); *G09G 2320/0673* (2013.01); *G09G 2320/0693* (2013.01); *G09G 2360/04* (2013.01); *G09G 2360/145* (2013.01)

(56) References Cited

U.S. PATENT DOCUMENTS

| 2010/0026702 | A1* | 2/2010 | Herbert | G09G 5/02 345/589 |
| 2011/0285608 | A1* | 11/2011 | Shen | G06F 3/147 345/3.1 |
| 2012/0154355 | A1* | 6/2012 | Kawai | G09G 3/2007 345/207 |
| 2012/0314129 | A1* | 12/2012 | Mertens | G11B 27/11 348/474 |
| 2014/0198316 | A1* | 7/2014 | Chen | G09G 3/006 356/448 |
| 2015/0117775 | A1 | 4/2015 | Abe et al. | |
| 2015/0269882 | A1* | 9/2015 | Kimpe | G09G 3/3406 345/690 |
| 2017/0047022 | A1* | 2/2017 | Ikeda | G09G 3/36 |

FOREIGN PATENT DOCUMENTS

| JP | 2011-133877 A | 7/2011 |
| JP | 2013-210773 A | 10/2013 |

* cited by examiner

CREATION DISPLAY DEVICE
($80 cd/m^2$)

SHOWING DISPLAY DEVICE
($400 cd/m^2$)

BEFORE CHANGING
GRADATION CHARACTERISTICS

SHOWING DISPLAY DEVICE
($400 cd/m^2$)

AFTER CHANGING
GRADATION CHARACTERISTICS

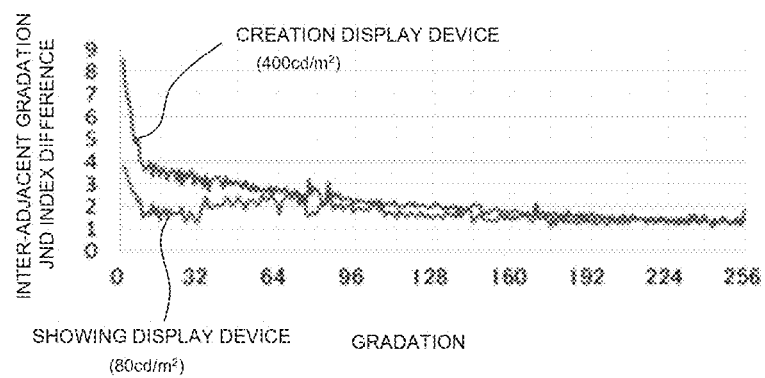

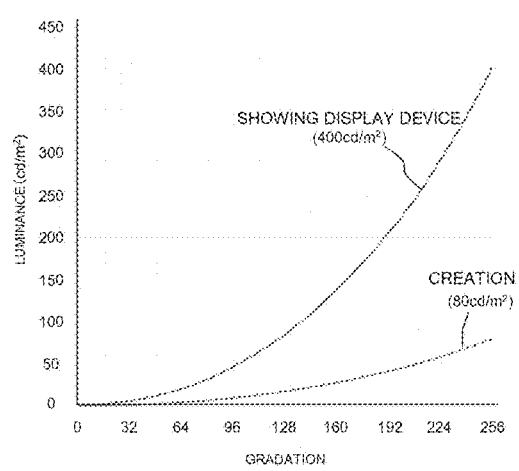
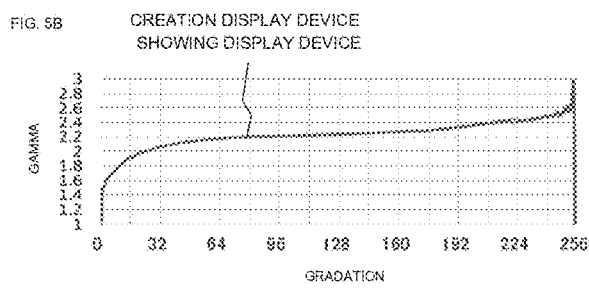

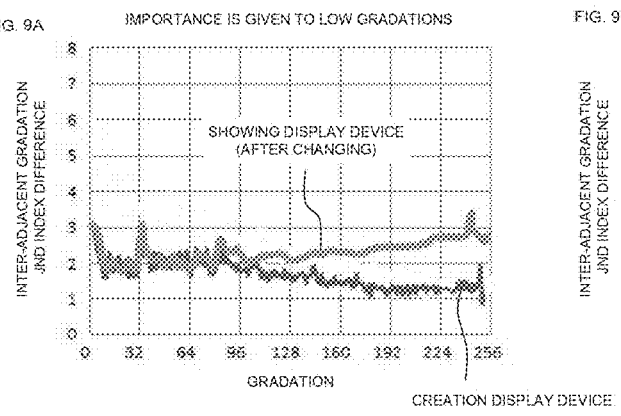
FIG. 9A IMPORTANCE IS GIVEN TO LOW GRADATIONS
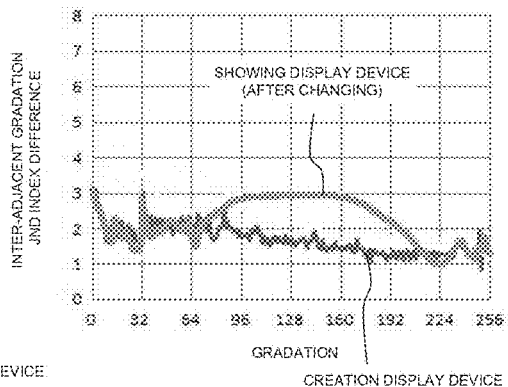
FIG. 9C IMPORTANCE IS GIVEN TO LOW AND HIGH GRADATIONS
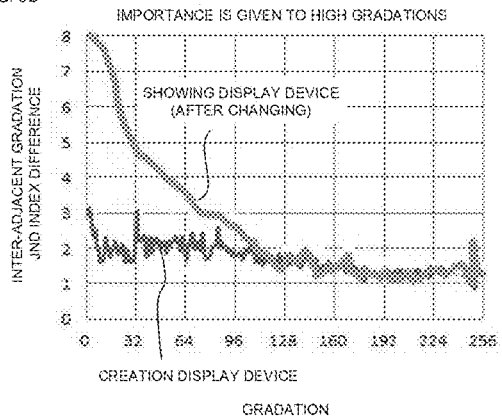
FIG. 9B IMPORTANCE IS GIVEN TO HIGH GRADATIONS

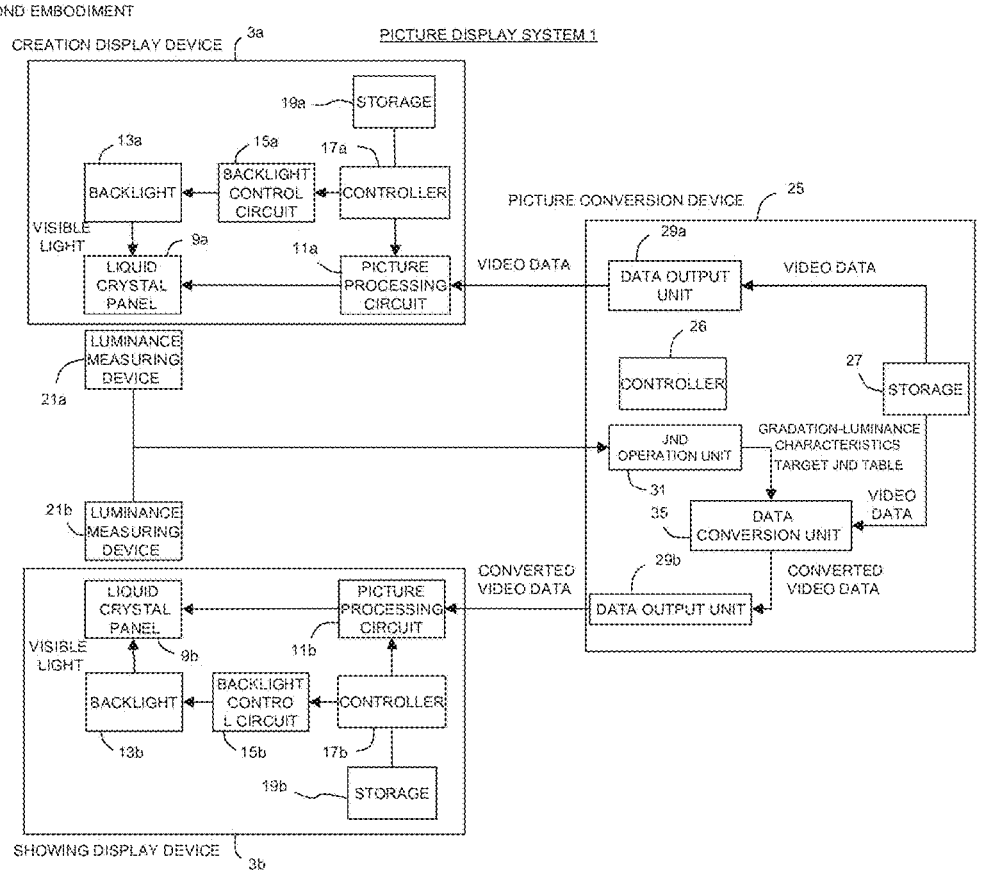

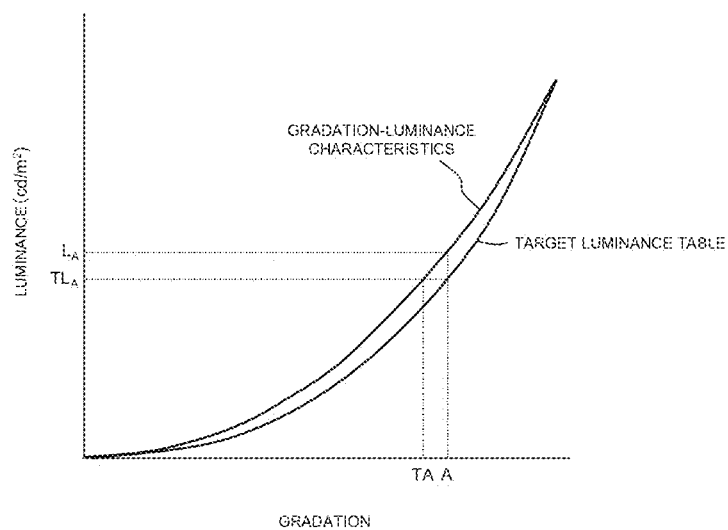
FIG. 11 SECOND EMBODIMENT

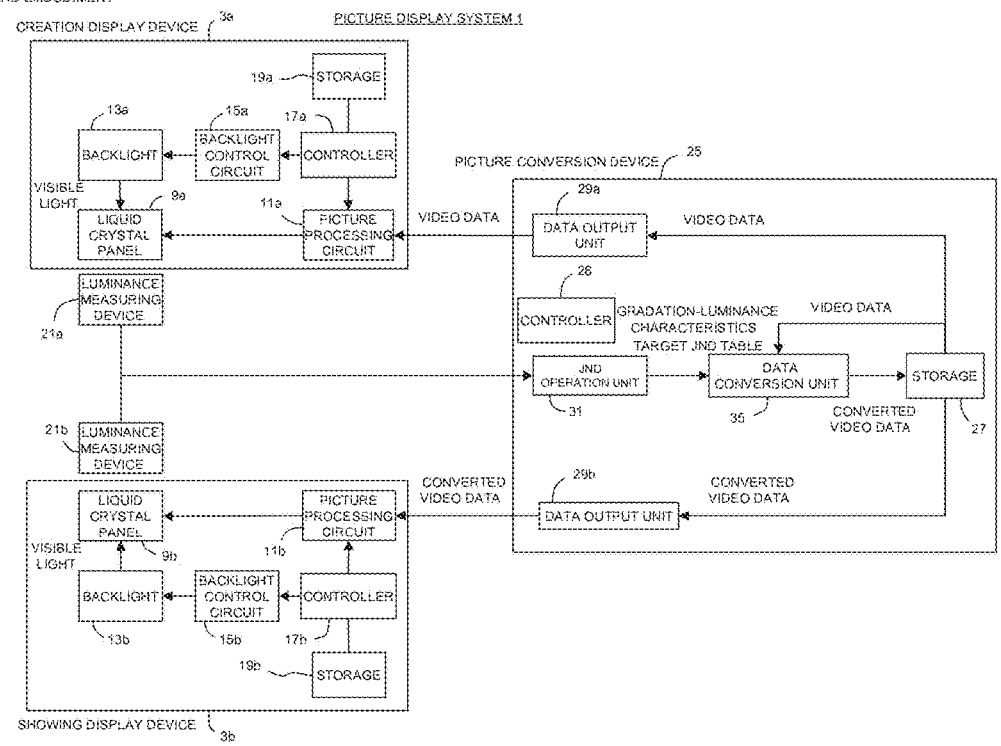
FIG. 12 THIRD EMBODIMENT

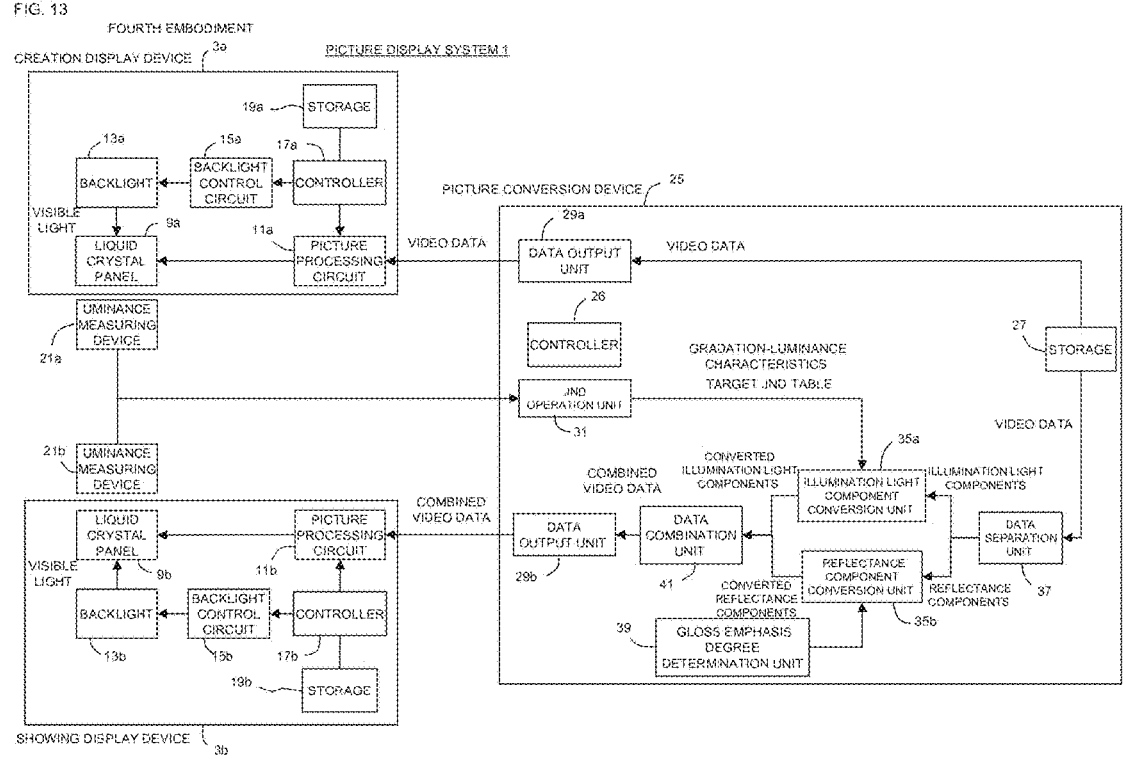

PICTURE CONVERSION METHOD, PICTURE CONVERSION DEVICE, COMPUTER PROGRAM FOR PICTURE CONVERSION, AND PICTURE DISPLAY SYSTEM

TECHNICAL FIELD

The present invention relates to a picture conversion method for, when displaying a picture obtained from identical video data on a display device at different display luminances, converting the picture so that the appearances of the picture visually come close to each other, a picture conversion device, a computer program for picture conversion, and a picture display system. In the present specification, the term "picture" includes both a moving picture and a still picture.

BACKGROUND ART

There are cases in which a display device is installed outdoors and an advertisement or the like is displayed on the display device. A display device used for such a purpose typically displays a picture at a high display luminance so that high viewability is obtained even outdoors. A picture displayed on such a display device is typically created using a display device that is installed indoors and has a low display luminance. Hereafter, a display device used to create a picture is referred to as a "creation display device," and a display device that displays a picture created using a creation display device, at a high display luminance is referred to as a "showing display device."

SUMMARY OF INVENTION

Technical Problem

When a picture created using a creation display device was displayed on a showing display device, the inventors found: although the same video data was used and the gammas of the two display devices were the same, the "appearance" was not reproduced as intended by the creator; and, for example, a picture that was mostly blackish and had a calm atmosphere, as shown in FIG. 1A, was displayed as a picture that was mostly bright, as shown in FIG. 1B.

If the display luminances of a creation display device and a showing display device are the same, the appearance can be reproduced. However, the creation display device may have difficulty in exhibiting a high display luminance, or the creator may have difficulty in knowing the display luminance of the showing display device when creating a picture. For this reason, it is difficult to make the display luminances of these display devices the same.

The present invention has been made in view of the foregoing, an object of the present invention is to provide a picture conversion method that when displaying a picture obtained from identical video data on a display device at different display luminances, can convert the picture so that the appearances of the picture visually come close to each other.

Solution to Problem

The present invention provides a picture conversion method for, when displaying a picture obtained from identical video data on a display device at different display luminances, converting the picture so that appearances of the picture visually come close to each other. The method includes a step of converting the picture by setting gradation characteristics when displaying the picture at a second luminance, so that an inter-close gradation JND corresponding value difference at the second display luminance comes close to an inter-close gradation JND corresponding value difference at a first display luminance in a target gradation range which is at least part of an entire gradation range.

The present inventors investigated the cause of the different "appearances" and then found that even when the two display devices had the same gamma, the difference between adjacent (or close) JND indices (the inter-adjacent (close) gradation JND index difference) significantly varied between these display devices, particularly at low gradations, as shown in FIG. 2. In the DICOM standard, the minimum luminance difference of a given target recognizable by an average human observer under a given observation condition is defined as 1 JND (just-noticeable difference). As used herein, the term "JND index" refers to an input value to the display device such that one step in the index results in a luminance difference that is a just-noticeable difference. The inter-adjacent gradation JND index difference represents the amount of increase of the JND index when the gradation is incremented by 1.

The present inventors then set gradation characteristics when showing a picture on the showing display device, using video data of a picture created using the creation display device so that the inter-adjacent gradation JND index difference of the showing display device came close to the inter-adjacent gradation JND index difference of the creation display device. Then, as shown in FIG. 1C, the inventors found that the appearance of the picture on the showing display device came close to the appearance of the picture on the creation display device.

Further, the present inventors found that when the display luminances during creation and during showing on the same display device were different, a similar problem occurred and that this problem could be solved using a similar method.

While a JND index conforming to the DICOM standard is based on the Barten Model for visual recognition, data that is derived using a method other than the Barten Model and corresponds to the minimum luminance difference recognizable by an observer may be used in place of a JND index. Hereafter, a JND index difference based on the Barten Model employed in the DICOM standard or a data difference that is derived using a method other than the Barten Model and corresponds to a minimum luminance difference recognizable by an observer is referred to as a "JND corresponding value difference."

The present inventors found that according to the method of the present invention, when displaying a picture obtained from identical video data on display devices at different display luminances, the picture could be converted so that appearances of the picture visually came close to each other, and then completed the present invention.

Various embodiments of the present invention are illustrated below. Any of the embodiments below can be combined with each other.

Preferably, the gradation characteristics are set in such a manner that the inter-close gradation JND corresponding value difference at the second display luminance is a value obtained by multiplying the inter-close gradation JND corresponding value difference at the first display luminance by a correction factor.

Preferably, the target gradation range includes a gradation range of 12.5% or less of a maximum gradation.

Preferably, the inter-close gradation JND corresponding value difference is an inter-adjacent gradation JND corresponding value difference.

Preferably, the second display luminance is higher than the first display luminance.

Preferably, the correction factor is calculated by dividing an inter-distant gradation JND corresponding value difference at the second display luminance by an inter-distant gradation JND corresponding value difference at the first display luminance.

Preferably, the inter-distant gradation JND corresponding value difference is calculated by subtracting a JND corresponding value at a minimum gradation from a JND corresponding value at a maximum gradation.

Preferably, the inter-close gradation JND corresponding value difference is an inter-close gradation JND index difference.

Preferably, the gradation characteristics are set by changing a luminance gradation value of the video data.

Preferably, the gradation characteristics are set by changing a luminance gradation value of an illumination light component of the video data.

Preferably, the display device includes a first display device that displays the picture at the first display luminance and a second display device that displays the picture at the second display luminance.

Another aspect of the present invention provides a picture conversion device for, when displaying a picture obtained from identical video data on a display device at different display luminances, converting the picture so that appearances of the picture visually come close to each other. The device includes a controller configured to perform control to convert the picture by setting gradation characteristics when displaying the picture at a second luminance, so that an inter-close gradation JND corresponding value difference at the second display luminance comes close to an inter-close gradation JND corresponding value difference at a first display luminance in a target gradation range which is at least part of an entire gradation range.

Yet another aspect of the present invention provides a computer program for, when displaying a picture obtained from identical video data on a display device at different display luminances, converting the picture so that appearances of the picture visually come close to each other. The computer program causes a computer to perform a step of converting the picture by setting gradation characteristics when displaying the picture at a second luminance, so that an inter-close gradation JND corresponding value difference at the second display luminance comes close to an inter-close gradation JND corresponding value difference at a first display luminance in a target gradation range which is at least part of an entire gradation range.

Still yet another aspect of the present invention provides a picture display system for, when displaying a picture obtained from identical video data on a display device at different display luminances, displaying the picture so that appearances of the picture visually come close to each other. The system includes a controller configured to perform control to display the picture on the display device by setting gradation characteristics when displaying the picture at a second luminance, so that an inter-close gradation JND corresponding value difference at the second display luminance comes close to an inter-close gradation JND corresponding value difference at a first display luminance in a target gradation range which is at least part of an entire gradation range.

Preferably, the controller is included in the display device.

Preferably, the controller is included in a picture conversion device disposed separately of the display device.

BRIEF DESCRIPTION OF THE DRAWINGS

FIGS. 1A to 1C show a sample picture showing a problem to be solved by the present invention, in which FIG. 1C shows a picture obtained by applying a picture conversion method of the present invention to FIG. 1B.

FIG. 2 is a graph showing the relationship between the gradation and inter-adjacent gradation JND index difference, which shows the problem to be solved by the present invention.

FIG. 5A is a graph showing the relationship between the gradation and luminance of a showing display device and creation display device, and FIG. 5B is a graph showing the relationship between the gradation and gamma thereof.

FIGS. 7A and 7B includes diagrams showing the relationship between the gradation and inter-adjacent gradation JND index difference of the showing display device, in which FIG. 7A shows a state before the gradation characteristics are changed; and FIG. 7B shows a state after the gradation characteristics are changed.

FIG. 8 is a graph showing the relationship between the gradation and inter-adjacent gradation JND index difference of a display device conforming to the DICOM standard.

FIGS. 9A to 9C are graphs showing the relationship between the gradation and inter-adjacent gradation JND index difference of the showing display device, which show a state after the gradation characteristics are changed with importance given to low gradations, high gradations, or both.

FIG. 10 is a block diagram showing the configuration of a picture display system 1 of a second embodiment of the present invention.

FIG. 11 is a graph showing the relationship between the gradation and luminance for showing a picture conversion method of the second embodiment of the present invention.

FIG. 12 is a block diagram showing the configuration of a picture display system 1 of a third embodiment of the present invention.

FIG. 13 is a block diagram showing the configuration of a picture display system 1 of a fourth embodiment of the present invention.

DETAILED DESCRIPTION

Now, embodiments of the present invention will be described. Features described in the embodiments below can be combined with each other. Elements or the like that are not described in second or later embodiments are similar to those described in a first embodiment. In the embodiments below, a JND index difference will be used as a JND corresponding value difference. However, the embodiments can also be applied to cases in which a JND corresponding value difference other than a JND index difference is used.

1. First Embodiment

Figure 3:
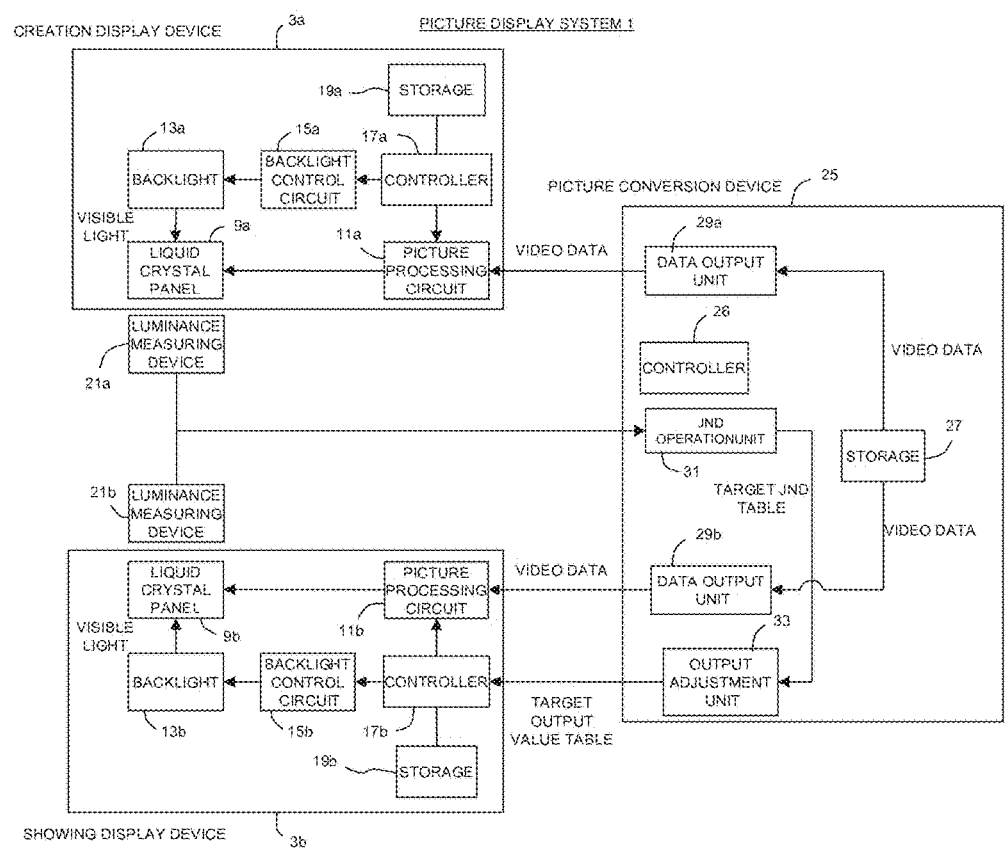
FIG. 3 is a block diagram showing the configuration of a picture display system 1 of a first embodiment of the present invention.

FIG. 3 is a block diagram showing the configuration of a picture display system 1 of the first embodiment of the present invention. The picture display system 1 includes a creation display device 3a, a showing display device 3b, and a picture conversion device 25. The creation display device 3a and showing display device 3b are configured to be able to communicate with the picture conversion device 25.

The display devices 3a, 3b include liquid crystal panels 9a, 9b, picture processing circuits 11a, 11b, backlights 13a, 13b, backlight control circuits 15a, 15b, controllers 17a, 17b, and storage 19a, 19b, respectively. Hereafter, reference signs a, b will be omitted where differentiation is not necessary.

The picture processing circuit 11 converts video data (a picture signal) received from outside into a signal most suitable for the liquid crystal panel 9 and outputs the signal as a liquid crystal panel picture signal. The backlight control circuit 15 applies a backlight drive voltage to the backlight 13 and outputs a current to be passed through the backlight 13, in accordance with a backlight control signal received from the controller 17. In PWM dimming, a backlight control signal is a signal that controls the duty ratio for turning on or off the current passing through the backlight 13. In DC dimming, a backlight control signal is a signal that controls the amount of the current passing through the backlight 13. The backlight 13 is driven by the backlight drive current outputted from the backlight control circuit 15 and thus outputs visible light. The user can adjust the luminance of the backlight 13 by operating a luminance setting value operation unit (not shown) to set a luminance setting value and then causing the backlight control circuit 15 to adjust the output current in accordance with the luminance setting value. The liquid crystal panel 9 displays a picture on the basis of the liquid crystal panel picture signal received from the picture processing circuit 11 and the visible light outputted by the backlight 13. The controller 17 consists of a CPU and memories and controls the entire display device 3. The operation of the controller 17 is stored in the storage 19 in the form of a program, and predetermined processing is performed when the CPU reads and executes this program. A luminance measurement device 21 is disposed adjacent to the liquid crystal panel 9 so that it can measure the luminance of screen light outputted from the liquid crystal panel 9.

The creation display device 3a is a display device used to create pictures, whereas the showing display device 3b is a display device for showing the pictures created using the creation display device 3a to many people. Typically, the display luminance (the luminance at the maximum gradation) of the creation display device 3a is lower than that of the showing display device 3b. For this reason, when the same video data is inputted to the picture processing circuits 11a, 11b and then pictures obtained from the video data are displayed on the liquid crystal panels 9a, 9b, the pictures show different appearances. In the present embodiment, gradation characteristics are set using a method described below so that the appearances come close to each other.

The picture conversion device 25 is, for example, a computer having a predetermined computer program installed therein. It includes a controller 26, a storage 27, data output units 29a, 29b, a JND operation unit 31, and an output adjustment unit 33. These components can communicate with each other. The controller 26 consists of a CPU and memories and controls the entire picture conversion device 25. The operation of the controller 26 is stored in the storage 27 in the form of a program, and predetermined processing is performed when the CPU reads and executes this program. The storage 27 stores video data for pictures to be displayed on the liquid crystal panel 9. The data output unit 29 outputs the video data for the pictures to be displayed on the liquid crystal panel 9, to the display device 3. Instead of outputting the video data stored in the storage 27, the data output unit 29 may output video data inputted from outside to the picture conversion device 25. Also, instead of the data output unit 29, another device may output video data to the display device 3. The JND operation unit 31 creates a target JND table indicating target JND indices corresponding to the respective gradations on the basis of the luminance of screen light at a predetermined gradation obtained from the luminance measurement device 21. The output adjustment unit 33 creates a target output value table indicating target output values corresponding to the gradations on the basis of the target JND table and then outputs the target output value table to the controller 17b of the showing display device 3b.

Figure 4:
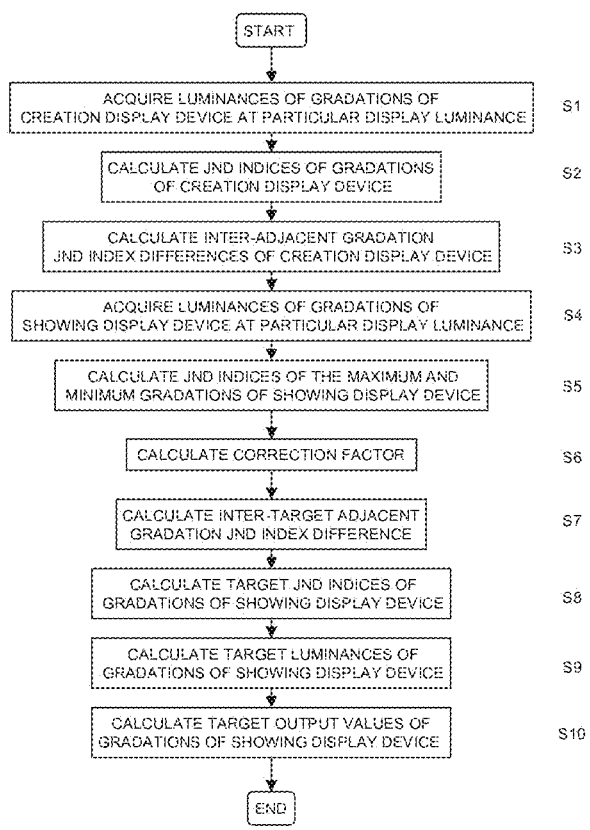
FIG. 4 is a flowchart showing a picture conversion method of the first embodiment of the present invention.

Referring now to a flowchart in FIG. 4, a picture conversion method using the picture display system 1 of the present embodiment will be described.

In step S1, as shown in column (1) of Table 1, the JND operation unit 31 measures luminances corresponding to the gradations of the creation display device 3a at a particular display luminance using the luminance measuring device 21a. Specifically, the data output unit 29a sequentially outputs pictures indicating gradations 0 to 255, and the JND operation unit 31 measures the luminances of the pictures of the gradations displayed on the liquid crystal panel 9a using the luminance measuring device 21a. The luminance at the maximum gradation (gradation 255) is the display luminance of the creation display device 3a and is about 80 cd/m². Even at gradation 0, the luminance is not 0 due to leak light. As shown in FIGS. 5A and 5B, gradation characteristics of the creation display device 3a are approximately a relationship of gamma 2.2. Specifically, the gamma is about 2.2 (in a range of 2.1 to 2.3) when the gradation is the median value (gradation 128) in the entire gradation range.

TABLE 1

| | CREATION DISPLAY DEVICE | | |
|---|---|---|---|
| GRADATION | (1) LUMINANCE (cd/m²) | (2) JND INDEX | (3) INTER-ADJACENT GRADATION JND INDEX DIFFERENCE |
| 0 | 0.12 | 13.05 | — |
| 1 | 0.14 | 15.74 | 2.69 |
| 2 | 0.16 | 18.22 | 2.49 |
| 3 | 0.18 | 20.55 | 2.32 |
| 4 | 0.21 | 23.78 | 3.23 |
| 5 | 0.23 | 25.8 | 2.01 |
| . | . | . | . |
| . | . | . | . |
| . | . | . | . |
| 255 | 80.45 | 447.61 | 1.53 |

In step S2, as shown in column (2) of Table 1, the JND operation unit 31 calculates the JND indices of the gradations of the creation display device 3a. A luminance L is converted into a JND index j(L) on the basis of a conversion formula (1) below defined in the DICOM standard.

[Formula 1]

LUMINANCE→JND INDEX $$j(L)=A+B\cdot \mathrm{Log}_{10}(L)+C\cdot (\mathrm{Log}_{10}(L))^2+D\cdot (\mathrm{Log}_{10}(L))^3+E\cdot (\mathrm{Log}_{10}(L))^4+F\cdot (\mathrm{Log}_{10}(L))^5+G\cdot (\mathrm{Log}_{10}(L))^6+H\cdot (\mathrm{Log}_{10}(L))^7+I\cdot (\mathrm{Log}_{10}(L))^8 \quad (1)$$

A=71.498068, B=94.593053, C=41.912053, D=9.8247004

E=0.28175407, F=1.1878455, G=0.18014349, H=0.14710899
I=0.017046845

In step S3, as shown in column (3) of Table 1, the JND operation unit 31 calculates the inter-adjacent gradation JND index differences of the creation display device 3a. For example, the inter-adjacent gradation JND index difference of gradation 1 is calculated by subtracting the JND index (13.05) of gradation 0 from the JND index (15.74) of gradation 1.

In step S4, as shown in column (4) of Table 2, the JND operation unit 31 measures luminances corresponding to the gradations of the showing display device 3b at a particular display luminance using the measuring device 21b. Specifically, the data output unit 29b sequentially outputs pictures indicating gradations 0 to 255, and the JND operation unit 31 measures the luminances of the pictures of the gradations displayed on the liquid crystal panel 9b using the luminance measuring device 21b. The luminance at the maximum gradation (gradation 255) is the display luminance of the showing display device 3b and is about 400 cd/m². Even at gradation 0, the luminance is not 0 for leak light. As shown in FIGS. 5A and 5B, gradation characteristics of the showing display device 3b are approximately a relationship of gamma 2.2. Specifically, the gamma is about 2.2 (in a range of 2.1 to 2.3) when the gradation is the median value (gradation 128) in the entire gradation range.

TABLE 2

SHOWING DISPLAY DEVICE

| GRADATION | (4) LUMINANCE (cd/m²) | (5) JND INDEX | (7) INTER-TARGET ADJACENT GRADATION JND INDEX DIFFERENCE. | (8) TARGET JND INDICES | (9) TARGET LUMINANCES |
|---|---|---|---|---|---|
| 0 | 0.39 | 38.87 | — | 39.94 | 0.38 |
| 1 | 0.5 | 46.53 | 3.91 | 43.85 | 0.41 |
| 2 | 0.62 | 53.38 | 3.62 | 47.47 | 0.50 |
| 3 | 0.72 | 58.91 | 3.38 | 50.86 | 0.55 |
| 4 | 0.83 | 64.29 | 4.71 | 55.57 | 0.64 |
| 5 | 0.95 | 69.65 | 2.93 | 58.50 | 0.69 |
| . | . | . | . | . | . |
| . | . | . | . | . | . |
| . | . | . | . | . | . |
| 255 | 400 | 672.80 | 2.23 | 672.80 | 400 |

In step S5, as shown in column (5) of Table 2, the JND operation unit 31 calculates the JND indices of the maximum gradation (gradation 255) and minimum gradation (gradation 0) of the showing display device 3b. The luminance L is converted into the JND index j(L) on the basis of the conversion formula (1) above. Note that column (5) of Table 2 also shows the calculation results of the JND indices of gradations 1 to 5 for reference.

In step S6, the JND operation unit 31 calculates a correction factor C. The correction factor C is calculated by dividing the inter-distant gradation JND index difference of the showing display device 3b by the inter-distant gradation JND index difference of the creation display device 3a. The inter-distant gradation JND index difference is the difference in JND index between distant gradations (preferably, gradations distant by 50% or more in the entire gradation range; more preferably, gradations distant by 75% or more in the entire gradation range). Preferably, the inter-distant gradation JND index difference is a value calculated by subtracting the JND index at the minimum gradation from the JND index at the maximum gradation. In this case, the correction factor C is calculated as (672.80−38.87)/(447.61−13.05) ≈1.46. Note that the correction factor C may be determined using a method other than the method presented here. One such method involves changing the correction factor C while actually seeing pictures displayed on the display devices 3a, 3b and then using a value at which the appearances of these pictures come close to each other. The correction factor C need not be constant in the entire gradation range, and different correction factors C may be set for different gradation ranges. For example, a correction factor C of 1.2 is set for a gradation range of 0 to 25% in the entire gradation range; a correction factor C of 1.3 is set for a gradation range of 25 to 50%; and a correction factor C of 1.4 is set for a gradation range of 50 to 100%. As seen above, the correction factor C may be reduced as the gradation is reduced. Such settings of the correction factor C is particularly effective in improving the appearance, since the inter-adjacent gradation JND index differences of the display devices 3a, 3b in lower gradation ranges come close to each other. Also, there may be a gradation range in which the correction factor C is 1. In such a gradation range, the inter-adjacent gradation JND index differences of the display devices 3a, 3b are equal.

In step S7, as shown in column (7) of Table 2, the JND operation unit 31 calculates the inter-target adjacent gradation JND index difference. The inter-target adjacent gradation JND index difference is calculated by multiplying the inter-adjacent gradation JND index difference of the creation display device 3a by the correction factor C.

In step S8, the JND operation unit 31 calculates the target JND indices of the respective gradations of the showing display device 3b, as shown in column (8) of Table 2, and creates a target JND table indicating the target JND indices corresponding to the gradations. The target JND indices may be calculated by subtracting each inter-target adjacent gradation JND index difference from the JND index (672.80) at the maximum gradation.

In step S9, the output adjustment unit 33 converts the JND indices of the gradations in the target JND table into luminances, as shown in column (9) of Table 2, and creates a target luminance table indicating the target luminances of the gradations of the showing display device 3b. A JND index j is converted into a luminance L(j) on the basis of a conversion formula (2) below defined in the DICOM standard.

[Formula 2]

$$\log_{10} L(j) = \frac{a + c \cdot \text{Ln}(j) + e \cdot (\text{Ln}(j))^2 + g \cdot (\text{Ln}(j))^3 + m \cdot (\text{Ln}(j))^4}{1 + b \cdot \text{Ln}(j) + d \cdot (\text{Ln}(j))^2 + f \cdot (\text{Ln}(j))^3 + h \cdot (\text{Ln}(j))^4 + k \cdot (\text{Ln}(j))^5} \quad (2)$$

JND INDEX → LUMINANCE $j = 1 \sim 1023$
$a = -1.3011877,$
$b = 2.5840191 E - 2,$
$c = 8.0242636 E - 2,$
$d = 1.0320229 E - 1$
$e = 1.3646699 E - 1,$
$f = 2.8745620 E - 2,$
$g = 2.5468404 E - 2,$
$h = 3.1978977 E - 3$
$k = 1.2992634 E - 4,$
$m = 1.3635334 E - 3$ In step S10, the output adjustment unit 33 converts the luminances of the gradations in the target luminance table into target output values, creates a target output value table indicating the target output values of the gradations of the showing display device 3b, and outputs the table to the controller 17b of the showing display device 3b. The controller 17b changes a lookup table (LUT; a table indicating the output signal values corresponding to the gradations) included in the showing display device 3b using the target output value table. In this way, the gradation characteristics of the showing display device 3b are changed so that the appearance of the picture displayed on the showing display device 3b comes close to the appearance of the picture displayed on the creation display device 3a.

Figure 6A:
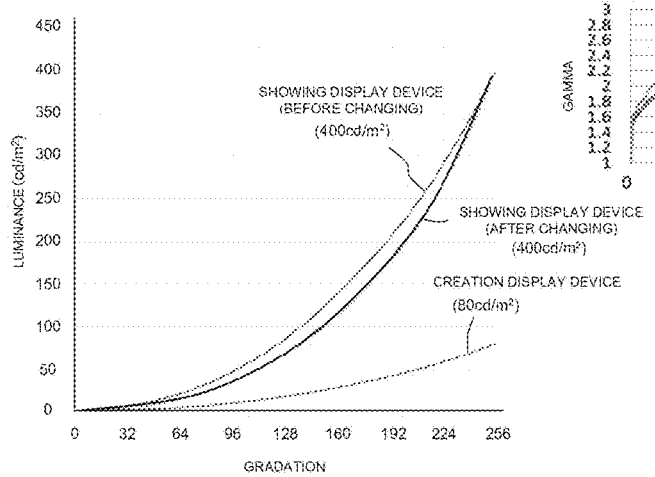
FIGS. 6A and 6B are graphs showing a state after gradation characteristics of the showing display device are changed and corresponding to FIGS. 5A and 5B.
Figure 6B:
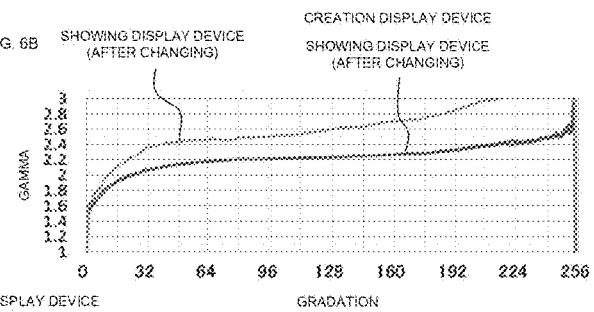

By changing the LUT, the output luminance values corresponding to the gradations are changed. As a result, as shown in FIGS. 6A and 6B, the luminances or gammas corresponding to the gradations of the showing display device 3b are changed from "Showing display device (before changing)" to "Showing display device (after changing)". Also, as shown in FIGS. 7A and 7B, the inter-adjacent gradation JND index differences corresponding to the gradations of the showing display device 3b are changed from "Showing display device (before changing)" to "Showing display device (after changing)".

Figure 7A:
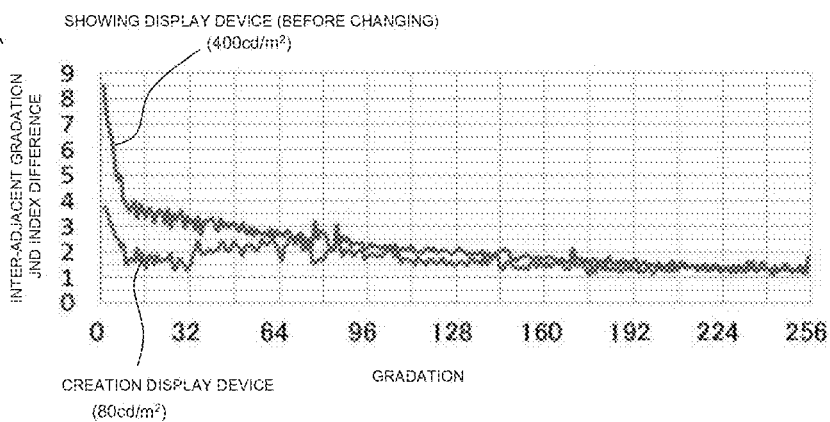
Figure 7B:
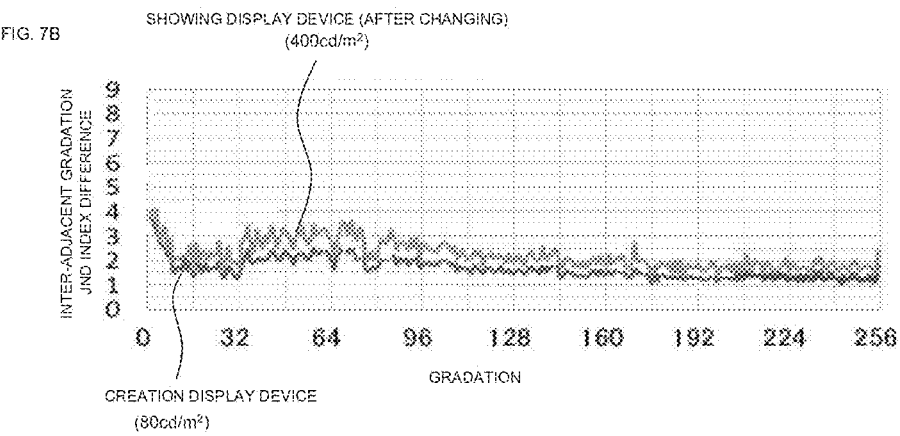

As the graphs indicating the gradation versus inter-adjacent gradation JND index difference of the creation display device 3a and showing display device 3b, as shown in FIGS. 7A and 7B, become more similar, the appearances of the pictures displayed on the creation display device 3a and showing display device 3b come closer to each other.

Figure 1A:
Figure 1B:
Figure 1C:

As shown in FIG. 7A, the inter-adjacent gradation JND index difference of the showing display device 3b before changing the gradation characteristics was greatly shifted from the inter-adjacent gradation JND index difference of the creation display device 3a, particularly in a gradation range of gradation 32 (12.5% of the maximum gradation) or less. For this reason, pictures obtained from identical video data show significantly different appearances, as shown in FIGS. 1A and 1B. On the other hand, as shown in FIG. 7B, the graph indicating the gradation versus inter-adjacent gradation JND index difference of the showing display device 3b after changing the gradation characteristics came significantly close to the graph of the creation display device 3a, particularly in a gradation range of gradation 32 or less. As a result, as shown in FIGS. 1A to 1C, the appearance of the picture displayed on the showing display device 3b could be brought close to the appearance of the picture displayed on the creation display device 3a, compared to that before changing the gradation characteristics. Note that in a comparison between FIG. 7A and FIG. 7B, the difference between the inter-adjacent gradation JND index differences of the creation display device 3a and showing display device 3b is mostly expanded in a gradation range of gradation 64 (25% of the maximum gradation) or more due to the changes in gradation characteristics. However, the width of the expansion is small and therefore the adverse effect on the appearance is negligible.

As seen above, in the present embodiment, the picture displayed on the showing display device 3b can be converted by changing the output luminance values corresponding to the gradations of the showing display device 3b.

One of the advantages of the picture conversion method of the present embodiment is that there is no need to use a special display device, such as a display device conforming to the DICOM standard, as the creation display device 3a, but rather a common display device commercially available as a monitor for PCs can be used. A display device conforming to the DICOM standard has a constant inter-adjacent gradation JND index difference in the entire gradation range, and a graph indicating the gradation versus inter-adjacent gradation JND index difference thereof is as shown in FIG. 8. A common display device, on the other hand, has a gamma of 2.2 as a de facto standard. As shown in FIG. 7, the value of the ratio between the maximum and minimum values of the inter-adjacent gradation JND index difference thereof in the entire gradation range is typically 1.5 or more. Also, with regard to a display device conforming to the DICOM standard, the shift of the contrast response thereof from the DICOM 3.14 display luminance response curve typically falls within 20%. With regard to a common display device, on the other hand, the shift does not fall within such a range. The method of the present embodiment can also be applied to such display devices, which do not conform to the DICOM standard [more specifically, GSDF (a gray scale standard display function defined in DICOM 3.0 Part14)].

The present invention may be carried out in the following aspects.

In the above embodiment, the controller 17b changes the LUT on the basis of the target output value table outputted by the output adjustment unit 33. Alternatively, the LUT may be changed as follows: the output adjustment unit 33 outputs the target luminance table indicating the target luminances of the gradations of the showing display device 3b, and the controller 17b changes the LUT by performing calibration on the basis of the target luminance table.

In the above embodiment, the gradation characteristics of the showing display device 3b are set by using the same correction factor C in the entire gradation range. However, depending on a picture to be displayed, particular importance may be given to the appearance of the picture at a low gradation range. Specifically, as shown in FIG. 9A, the difference between the inter-adjacent gradation JND index differences of the display devices 3a, 3b in a low gradation range may be particularly reduced. Or, depending on a picture to be displayed, particular importance may be given to the appearance of the picture in a high gradation range. Specifically, as shown in FIG. 9B, the difference between the inter-adjacent gradation JND index differences of the display devices 3a, 3b in a high gradation range may be particularly reduced. Or, depending on a picture to be displayed, particular importance may be given to the appearance of the picture in low and high gradation ranges. Specifically, as shown in FIG. 9C, the differences between the inter-adjacent gradation JND index differences of the display devices 3a, 3b in low and high gradation ranges may be particularly reduced. Since the difference between the JND index at the maximum gradation and the JND index at the minimum gradation of the showing display device 3b does not change, the difference between the inter-adjacent gradation JND index differences of the display devices 3a, 3b in the gradation range to which particular importance is not given is increased as the inter-adjacent gradation JND index differences of the display devices 3a, 3b in the gradation range to which particular importance is given are brought closer to each other.

In the above embodiment, the inter-adjacent gradation JND index differences of the display devices 3a, 3b are calculated, and gradation characteristics are set so that the inter-adjacent gradation JND index differences come close to each other. Alternatively, the following method may be used: the difference in JND index between close gradations (the inter-close gradation JND index difference) of each of the display devices 3a, 3b is calculated, and gradation characteristics are set so that the inter-close gradation JND index differences come close to each other. Even in this case, the appearances of pictures displayed on the display devices 3a, 3b can be brought close to each other, although the accuracy is reduced. As used herein, the term "close gradations" means, for example, gradations having a difference of 5 or less, preferably 3 or less, more preferably 2 or less.

While, in the above embodiment, the creation display device 3a and showing display device 3b are different display devices, a single display device may be used for both production and showing by changing the display luminance. Specifically, a certain display device may be used as the creation display device 3a by setting the display luminance to, for example, 80 cd/m², as well as may be used as the showing display device 3b by setting the display luminance to, for example, 400 cd/m². This usage also has a problem similar to that when the creation display device 3a and showing display device 3b are different display devices, but this problem can also be solved by the picture conversion method of the present invention.

In the above embodiment, the luminances corresponding to the respective gradations are actually measured. Instead of actually measuring the luminances, the following method may be used: the luminances of gradations including the minimum gradation are calculated from a luminance setting value (e.g., 400 cd/m²), a contract value (e.g., 1000:1), and a set gamma value (e.g., 2.2); and JND indices are obtained from the calculated luminances. By using such a method, the system can be simplified, although the accuracy is reduced. If the luminance setting value is provided in the form of a relative value (80%, etc.), the luminance setting value may be estimated from the maximum luminance in the specification. The contract value may also be a specification value.

While, in the above embodiment, the display devices using the liquid crystal panels are used, display devices including another type of display panels such as organic EL panels, or projection-display devices such as projectors may be used. Also, the creation display device and showing display device may be different types of display devices.

In the above embodiment, the inter-target adjacent gradation JND index difference is calculated by multiplying the inter-adjacent gradation JND index difference of the creation display device 3a by the correction factor C and thus the inter-adjacent gradation JND index difference of the showing display device 3b is brought close to the inter-adjacent gradation JND index difference of the creation display device 3a. However, other methods may be used to bring the inter-adjacent gradation JND index difference of the showing display device 3b close to the inter-adjacent gradation JND index difference of the creation display device 3a. For example, the following method may be used: instead of using the correction factor C, a correction function F (gradation) having a gradation as an argument is set; and the inter-target adjacent gradation JND index difference is calculated by multiplying the inter-adjacent gradation JND index difference of the creation display device 3a by the correction function F (gradation). In this case, bringing the inter-adjacent gradation JND index difference of the showing display device 3b close to the inter-adjacent gradation JND index difference of the creation display device 3a in a gradation range including a gradation range of 12.5% or less of the maximum gradation is particularly effective in bringing the appearances close to each other.

In the above embodiment, the luminance based on screen light from the liquid crystal panel 9 is measured, and the luminance is converted into a JND index as it is. Alternatively, a JND index may be calculated considering the luminance based on the ambient light of the place in which the display device 3 is installed. In this case, for example, the luminance based on ambient light is calculated by multiplying the illumination of ambient light on the liquid crystal panel 9 by a diffuse reflection coefficient on the liquid crystal panel 9, and the total luminance of the luminance based on screen light and the luminance based on ambient light is converted into a JND index. In this case, the display luminance refers to the total luminance of the luminance based on screen light and the luminance based on ambient light.

While, in the above embodiment, gradation characteristics of the showing display device 3b are set under the control of the controller 26 included in the picture conversion device 25, the controller 17 included in the display device 3 may perform a similar function.

While, in the above embodiment, the picture conversion device 25 is a single device, two or more picture conversion devices may perform a similar function. For example, since the display devices 3a, 3b are typically disposed in different places, picture conversion devices may be disposed so as to be close to the respective display devices and provided with required functions. The picture conversion device 25 may be a general-purpose computer such as a workstation or personal computer, or may be a dedicated device disposed between a general-purpose computer and the display devices.

2. Second Embodiment

Figure 6:
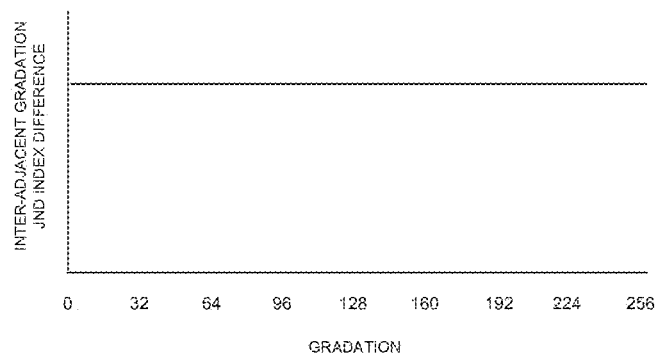

Referring now to FIGS. 10 and 11, a second embodiment of the present invention will be described. The present embodiment is similar to the first embodiment and mainly differs in that a data conversion unit 35 is provided in place of the output adjustment unit 33. In the first embodiment, gradation characteristics are set by changing the gradation-luminance characteristics of the showing display device 3b, as shown in FIG. 6. In the present embodiment, on the other hand, the gradation-luminance characteristics of a showing display device 3b are not changed, but rather the data conversion unit 35 changes the luminance gradation value of video data and thus gradation characteristics of the showing display device 3b during picture display are set.

As shown in FIG. 10, a JND operation unit 31 inputs, to the data conversion unit 35, a target JND table indicating target JND indices corresponding to the respective gradations of the showing display device 3b and the gradation-luminance characteristics of the showing display device 3b. The target JND indices are converted into a target luminance table indicating the target luminances of the gradations of the showing display device 3b on the basis of the conversion formula (2) above. By using the gradation-luminance characteristics and the target luminance table, a graph shown in FIG. 11 can be created.

Video data is also inputted to the data conversion unit 35. Assume that the luminance gradation value of a certain pixel P contained in the video data is A (e.g., gradation 192). When this video data is inputted to the showing display device 3b as it is, the pixel P emits light at a luminance $L_A$ in accordance with the gradation-luminance characteristics shown in FIG. 11. To bring the appearances of pictures displayed on the display devices 3a, 3b close to each other, it is necessary to cause the pixel P having the luminance gradation value A to emit light at a luminance $TL_A$ in accordance with the target luminance table. To cause the pixel P to emit light at the luminance $TL_A$, it is only necessary to input a gradation TA corresponding to the luminance $TL_A$ in the gradation-luminance characteristics to the showing display device 3b. In sum, by changing the luminance gradation value A of the certain pixel P included in the video data to TA, it is possible to cause the pixel P to emit light at the luminance $TL_A$ in accordance with the target luminance table. As seen above, the data conversion unit 35 changes the luminance gradation values of the pixels so that the pixels contained in video data emit light at luminances according to the target luminance table.

A data output unit 29b outputs the video data converted by the data conversion unit 35 to a picture processing circuit 11b.

According to the present embodiment, the gradation-luminance characteristics of the showing display device 3b are not changed, but rather the luminance gradation value of video data is changed. Thus, the appearances of pictures displayed on the display devices 3a, 3b can be brought close to each other.

3. Third Embodiment

Referring now to FIG. 12, a third embodiment of the present invention will be described. The present embodiment is similar to the second embodiment and differs in that converted video data is stored in a storage 27 and then transmitted to a data output unit 29b.

In the second embodiment, video data is converted each time a picture is displayed and therefore the conversion process is a heavy load. In the present embodiment, on the other hand, once video data is converted, pictures can be displayed using the converted video data from then on. Also, in the present embodiment, the conversion and display of a picture can be performed separately. Thus, the following is possible: a picture is only converted; the converted video data is stored in a storage 27; the converted video data is read from the storage 27 at a required timing; and the read video data is displayed on a showing display device 3b.

4. Fourth Embodiment

Referring now to FIG. 13, a fourth embodiment of the present invention will be described. The present embodiment is similar to the second embodiment and mainly differs in that video data is temporarily separated into illumination light components and reflectance components and then the data conversion described in the second embodiment is performed on the illumination light components.

In the present embodiment, first, a data separation unit 37 separates video data into illumination light components and reflectance components on the basis of the Retinex theory. Examples of the separation method include methods disclosed in Japanese Patent Nos. 5247910 and 5470415. Then, an illumination light component conversion unit 35a performs data conversion similar to that of the second embodiment on the illumination light components and outputs the resulting illumination light components. On the other hand, a reflectance component conversion unit 35b converts the reflectance components in such a manner that the reflectance components are emphasized by a value determined by a gloss emphasis degree determination unit 39 and then outputs the resulting reflectance components. Note that the reflectance components may be left intact by omitting the reflectance component conversion unit 35b.

Then, a data combination unit 41 combines the converted illumination light components and reflectance components and outputs the combined video data. A data output unit 29b outputs the video data combined by the data combination unit 41 to a picture processing circuit 11b.

In the second embodiment, all the components of video data are converted in accordance with a target luminance table. This causes a problem that reflectance components related to the gloss of an object may also be converted, which may result in a change in the glossy appearance of the object. In the present embodiment, on the other hand, after separating video data into illumination light components and reflectance components, data conversion is performed only on the illumination light components in accordance with a target luminance table. Thus, the glossy appearance of the object can be maintained.

The invention claimed is:

1. A picture conversion method for, when displaying a picture obtained from identical video data on a display device, converting the picture so that appearances of the picture visually come close to each other, the method comprising
a step of converting the picture by setting gradation characteristics when displaying the picture at a second display luminance, so that an inter-close gradation JND corresponding value difference at the second display luminance comes close to an inter-close gradation JND corresponding value difference at a first display luminance in a target gradation range which is at least part of an entire gradation range,
wherein the gradation characteristics are set in such a manner that the inter-close gradation JND corresponding value difference at the second display luminance is a value obtained by multiplying the inter-close gradation JND corresponding value difference at the first display luminance by a correction factor, and
wherein the first display luminance and the second display luminance are different from each other.

2. The picture conversion method of claim 1, wherein the target gradation range comprises a gradation range of 12.5% or less of a maximum gradation.

3. The picture conversion method of claim 1, wherein the inter-close gradation JND corresponding value difference is an inter-adjacent gradation JND corresponding value difference.

4. The picture conversion method of claim 1, wherein the second display luminance is higher than the first display luminance.

5. The picture conversion method of claim 1, wherein the correction factor is calculated by dividing an inter-distant gradation JND corresponding value difference at the second display luminance by an inter-distant gradation JND corresponding value difference at the first display luminance.

6. The picture conversion method of claim 5, wherein the inter-distant gradation JND corresponding value difference is calculated by subtracting a JND corresponding value at a minimum gradation from a JND corresponding value at a maximum gradation.

7. The picture conversion method of claim 1, wherein the inter-close gradation JND corresponding value difference is an inter-close gradation JND index difference.

8. The picture conversion method of claim 1, wherein the gradation characteristics are set by changing output luminance values corresponding to respective gradations of the display device.

9. The picture conversion method of claim 1, wherein the gradation characteristics are set by changing a luminance gradation value of the video data.

10. The picture conversion method of claim 1, wherein the gradation characteristics are set by changing a luminance gradation value of an illumination light component of the video data.

11. The picture conversion method of claim 1, wherein the display device comprises a first display device that displays the picture at the first display luminance and a second display device that displays the picture at the second display luminance.

12. A picture conversion device for, when displaying a picture obtained from identical video data on a display device, converting the picture so that appearances of the picture visually come close to each other,
the device comprising a controller configured to perform control to convert the picture by setting gradation characteristics when displaying the picture at a second display luminance, so that an inter-close gradation JND corresponding value difference at the second display luminance comes close to an inter-close gradation JND corresponding value difference at a first display luminance in a target gradation range which is at least part of an entire gradation range,
wherein the gradation characteristics are set in such a manner that the inter-close gradation JND corresponding value difference at the second display luminance is a value obtained by multiplying the inter-close gradation JND corresponding value difference at the first display luminance by a correction factor, and
wherein the first display luminance and the second display luminance are different from each other.

13. A non-transitory computer readable medium having executable programming instructions for, when displaying a picture obtained from identical video data on a display device, converting the picture so that appearances of the picture visually come close to each other, and
performing a step of converting the picture by setting gradation characteristics when displaying the picture at a second display luminance, so that an inter-close gradation JND corresponding value difference at the second display luminance comes close to an inter-close gradation JND corresponding value difference at a first display luminance in a target gradation range which is at least part of an entire gradation range,
wherein the gradation characteristics are set in such a manner that the inter-close gradation JND corresponding value difference at the second display luminance is a value obtained by multiplying the inter-close gradation JND corresponding value difference at the first display luminance by a correction factor, and
wherein the first display luminance and the second display luminance are different from each other.

14. A picture display system for, when displaying a picture obtained from identical video data on a display device, displaying the picture so that appearances of the picture visually come close to each other,
the system comprising a controller configured to perform control to display the picture on the display device by setting gradation characteristics when displaying the picture at a second display luminance, so that an inter-close gradation JND corresponding value difference at the second display luminance comes close to an inter-close gradation JND corresponding value difference at a first display luminance in a target gradation range which is at least part of an entire gradation range,
wherein the gradation characteristics are set in such a manner that the inter-close gradation JND corresponding value difference at the second display luminance is a value obtained by multiplying the inter-close gradation JND corresponding value difference at the first display luminance by a correction factor, and
wherein the first display luminance and the second display luminance are different from each other.

15. The picture display system of claim 14, wherein the controller is included in the display device.

16. The picture display system of claim 14, wherein the controller is included in a picture conversion device disposed separately of the display device.

* * * * *